United States Patent
Henry et al.

(10) Patent No.: US 11,653,206 B2
(45) Date of Patent: May 16, 2023

(54) TRUSTED ROAMING FOR FEDERATION-BASED NETWORKS

(71) Applicant: Cisco Technology, Inc., San Jose, CA (US)

(72) Inventors: Jerome Henry, Pittsboro, NC (US); Robert E. Barton, Richmond (CA); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 17/301,971

(22) Filed: Apr. 20, 2021

(65) Prior Publication Data

US 2022/0338010 A1    Oct. 20, 2022

(51) Int. Cl.
| | |
|---|---|
| *H04W 12/08* | (2021.01) |
| *H04W 12/06* | (2021.01) |
| *H04W 36/00* | (2009.01) |
| *H04W 60/06* | (2009.01) |
| *H04W 76/11* | (2018.01) |
| *H04W 12/0431* | (2021.01) |

(52) U.S. Cl.
CPC ....... *H04W 12/08* (2013.01); *H04W 12/0431* (2021.01); *H04W 12/06* (2013.01); *H04W 36/0022* (2013.01); *H04W 60/06* (2013.01); *H04W 76/11* (2018.02)

(58) Field of Classification Search
CPC ............. G06F 21/31; G06F 2221/2129; G06F 21/6218; H04L 63/10; H04L 9/0822; H04L 63/0853; H04L 9/30; H04L 63/062; H04L 63/0407; H04L 63/06; H04L 63/104; G06Q 50/265; G06Q 20/325; H04W 12/08; H04W 12/06; H04W 48/20; H04W 48/18; H04W 36/08; H04W 88/08; H04W 36/0016; H04W 36/14; H04W 88/12
USPC .......................................... 726/4, 9; 370/235
See application file for complete search history.

(56) References Cited

U.S. PATENT DOCUMENTS

| | | | |
|---|---|---|---|
| 2006/0256763 A1 | 11/2006 | Nguyen et al. | |
| 2008/0064394 A1 | 3/2008 | Maes | |
| 2015/0264051 A1* | 9/2015 | Hoggan | H04W 12/065 726/1 |
| 2015/0350873 A1* | 12/2015 | Choi | H04W 36/0085 455/432.1 |
| 2018/0184345 A1 | 6/2018 | Likar et al. | |
| 2019/0222568 A1* | 7/2019 | Sridhar | H04L 9/14 |

(Continued)

*Primary Examiner* — Kiet M Doan
(74) *Attorney, Agent, or Firm* — Patterson + Sheridan, LLP

(57) ABSTRACT

Techniques for trusted roaming between identity federation based networks. A first wireless access point (AP) receives a roaming request from a wireless station (STA), to roam from the first AP to a second AP. The first AP is associated with a first access network provider (ANP), the second AP is associated with a second ANP, and the first ANP is different from the second ANP. Authentication information relating to the STA is transmitted from the first ANP to the second ANP using a trusted connection. The trusted connection was previously established between the first ANP and the second ANP based on a query to an identity federation to which both the first and second ANP belong. The STA is de-associated from the first AP. The STA is re-associated at the second AP using the transmitted authentication information.

14 Claims, 6 Drawing Sheets

(56) References Cited

U.S. PATENT DOCUMENTS

2020/0163013 A1   5/2020  Grayson et al.
2021/0037454 A1   2/2021  Gundavelli et al.

* cited by examiner

US 11,653,206 B2

TRUSTED ROAMING FOR FEDERATION-BASED NETWORKS

TECHNICAL FIELD

Embodiments presented in this disclosure generally relate to communication networks. More specifically, embodiments disclosed herein relate to trusted roaming between identity federation based networks.

BACKGROUND

Federation-based networks (e.g., OpenRoaming™) use encryption to protect and maintain the continuity of user sessions. For example, federation-based networks can use Wi-Fi Protected Access 2 (WPA2) or Wi-Fi Protected Access 3 (WPA3) encryption schemes. In federation-based networks a user can roam from one access point (AP) to another AP, within the same Access Network Provider (ANP), using standard key management techniques (e.g., 802.11r key management). This allows the key to be passed from one AP to the next AP, within the ANP, so that the user can continue the session seamlessly.

In some venues, however, multiple federation-based ANPs are adjacent to each other. For example, in larger public venues multiple ANPs may be adjacent to each other. When a user moves through the venue, the user's station (STA) (e.g., a handheld wireless device) attempts to attach to the best available network service set identifier (SSID). But the best available SSID may keep changing with the location and position of the STA, or even as radio frequency (RF) conditions change. Each time the user moves from one adjacent network in one domain, to another adjacent network in a different domain, the STA must be fully authenticated, because standard key management techniques (e.g., 802.11r key management) do not function across different ANPs. This is true even if the STA uses the same identity federation credentials across domains. This can result in a poor user experience, especially for real-time applications, and wasted network traffic and computation from full authentication.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
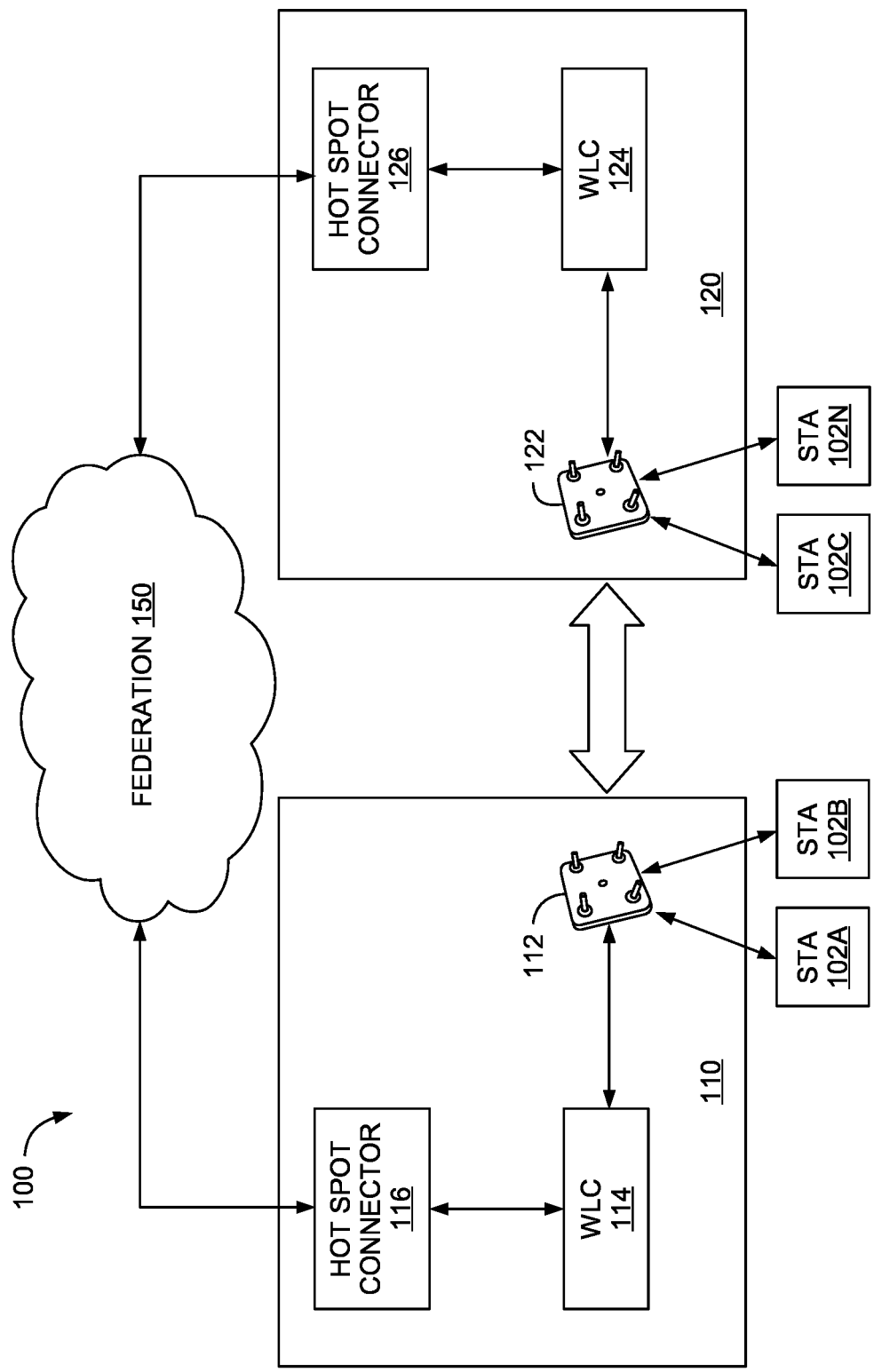
FIG. 1 illustrates a communication network with seamless identity federation roaming, according to one embodiment.

Embodiments include a method. The method includes receiving a roaming request at a first wireless access point (AP) from a wireless station (STA) to roam from the first AP to a second AP. The first AP is associated with a first access network provider (ANP), the second AP is associated with a second ANP, and the first ANP is different from the second ANP. The method further includes transmitting authentication information relating to the STA from the first ANP to the second ANP using a trusted connection. The trusted connection was previously established between the first ANP and the second ANP based on a query to an identity federation to which both the first and second ANP belong. The method further includes de-associating the STA from the first AP. The STA is re-associated at the second AP using the transmitted authentication information.

Embodiments further include a computer program product, including a non-transitory computer-readable storage medium having computer-readable program code embodied therewith, the computer-readable program code executable by one or more computer processors to perform an operation. The operation includes receiving a roaming request at a first AP from a STA to roam from the first AP to a second AP. The first AP is associated with a first ANP, the second AP is associated with a second ANP, and the first ANP is different from the second ANP. The operation further includes transmitting authentication information relating to the STA from the first ANP to the second ANP using a trusted connection. The trusted connection was previously established between the first ANP and the second ANP based on a query to an identity federation to which both the first and second ANP belong. The operation further includes de-associating the STA from the first AP. The STA is re-associated at the second AP using the transmitted authentication information.

Embodiments further include a system including a processor, and a memory storing a program, which, when executed on the processor, performs an operation. The operation includes receiving a roaming request at a first AP from a STA to roam from the first AP to a second AP. The first AP is associated with a first ANP, the second AP is associated with a second ANP, and the first ANP is different from the second ANP. The operation further includes transmitting authentication information relating to the STA from the first ANP to the second ANP using a trusted connection. The trusted connection was previously established between the first ANP and the second ANP based on a query to an identity federation to which both the first and second ANP belong. The operation further includes de-associating the STA from the first AP. The STA is re-associated at the second AP using the transmitted authentication information.

Example Embodiments

One or more techniques disclosed herein allow for session continuity as an STA moves from one identity federation based network to another, without requiring full authentication. This can be referred to as seamless identity federation roaming (SIFR). In an embodiment, participating networks discover neighboring networks that support SIFR through advertisements transmitted between participating networks. For example, participating networks can advertise participation using a specific Roaming Consortium Organization Identifier (RCOI), through an information element (IE) in network messages (e.g., beacons or probe responses), or through another suitable technique.

A participating network can then establish a SIFR connection with an adjacent participating network. For example, a participating network can leverage identity federation techniques to exchange SSIDs with an adjacent participating network in a secure fashion, and to establish a trusted connection with the adjacent participating network. The participating network can then exchange keep-alive messages with the trusted adjacent network to maintain the trusted network. Establishing the trusted connection is discussed further below with regard to FIGS. 3-4, and 6.

After the trusted connection is established between adjacent participating networks, a STA can seamlessly roam between the participating networks without requiring full authentication. For example, as a STA approaches the edge of a currently connected AP cell, it can use an RCOI as a virtual SSID to bridge the STA between participating networks. The STA can then roam from one ANP to another ANP, using the trusted connection, without requiring full authentication. This is discussed further below with regard to FIGS. 3 and 5.

FIG. 1 illustrates a communication network 100 with SIFR, according to one embodiment. In an embodiment, the communication network 100 includes a first access network provider (ANP) 110 and a second ANP 120. For example, the ANP 110 can be a network provided at a first physical location (e.g., a store in a shopping area) and the ANP 120 can be a network provided at an unrelated, but adjacent, physical location (e.g., an adjacent store or restaurant in a shopping area). That is, the ANP 110 and the second ANP 120 may be operated by two separate and independent entities but may be part of the same identity federation 150 (e.g., an OpenRoaming™ federation).

The ANP 110 includes an AP 112, a wireless local area network (LAN) controller (WLC) 114, and a hotspot connector 116. In an embodiment, the STAs 102A and 102B are connected to the AP 112. STAs 102A-N can be any suitable wireless device, including a laptop computer, a desktop computer, a smartphone, a tablet, a wearable device, an Internet of Things (IoT) device, or any other suitable wireless device. Further, in an embodiment, the AP 112 communicates with the WLC 114 using the Control and Provisioning of Wireless Access Points (CAPWAP) protocol, or another suitable protocol. Alternatively, the AP 112 can itself function as a WLC without requiring the WLC 114 (e.g., the ANP 110 may not include the WLC 114). In an embodiment the WLC 114 communicates with the hotspot connector 116 using Remote Authentication Dial-In User Service (RADIUS). The hotspot connector 116 communicates with the Internet, including the federation 150. In an embodiment, the hotspot connector 116 communicates with the federation 150 using the RadSec protocol. These are merely examples, and any suitable communication techniques and protocols can be used by the ANP 110.

The ANP 120 includes an AP 122, a WLC 124, and a hotspot connector 126. In an embodiment, STAs 102C-N are connected to the AP 122. Further, just as in the ANP 110, in an embodiment, the AP 122 communicates with the WLC 124 using the CAPWAP protocol, or another suitable protocol. Alternatively, the AP 122 can itself function as a WLC without requiring the WLC 124 (e.g., the ANP 120 may not include the WLC 124). In an embodiment the WLC 124 communicates with the hotspot connector 126 using RADIUS. The hotspot connector 126 communicates with the Internet, including the federation 150. In an embodiment, the hotspot connector 126 communicates with the federation 150 using the RadSec protocol. These are merely examples, and any suitable communication techniques and protocols can be used by the ANP 120.

In an embodiment, both the ANP 110 and the ANP 120 support an identity federation, and are in communication with the federation 150 through the respective hotspot connectors 116 and 126. Further, in an embodiment, both the ANP 110 and the ANP 120 support SIFR. For example, the AP 112 and the AP 122 can both advertise support for SIFR. As discussed above, this could be done using a specific RCOI, or through an IE in a network message (e.g., a beacon or probe response).

In an embodiment, the AP 112 detects the AP 122 and the SIFR advertisement. For example, the AP 112 can use neighborhood discovery techniques to identify nearby APs, and can further identify SIFR advertisements from nearby APs. The hotspot connector 116 and the hotspot connector 126 can use the federation 150 to establish a trusted connection between the ANPs 110 and 120. The STA 102B can then use the trusted connection to roam from the AP 112 to the AP 122 without full authentication. This is discussed further below, with regard to FIGS. 3-6.

Figure 2:
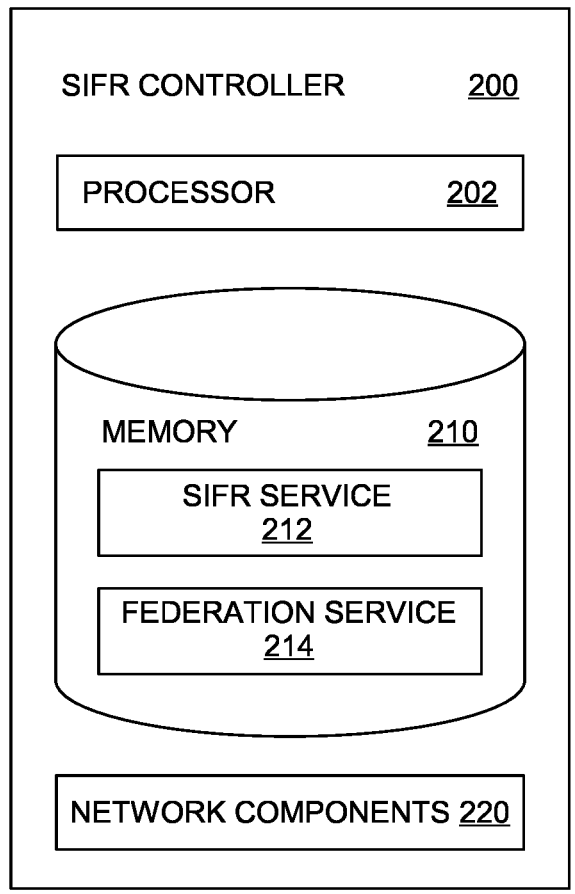
FIG. 2 illustrates a seamless identity federation roaming controller, according to one embodiment.

FIG. 2 illustrates a SIFR controller 200, according to one embodiment. In an embodiment, the SIFR controller 200 can correspond with any suitable network component, including the STAs 102A-N, the WLCs 114 and 124, the APs 112 and 122, or the hotspot connectors 116 and 126 illustrated in FIG. 1. That is, as discussed further below, the SIFR techniques discussed in relation to FIG. 3-6 can be implemented in any suitable network component, can be divided across multiple network components (e.g., divided among an AP, a WLC, and a hotspot connector), or both.

The SIFR controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the SIFR controller to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the SIFR controller 200. The program code is generally described as various functional "applications" or "modules" within the memory 210, although alternate implementations may have different functions and/or combinations of functions. Within the memory 210, the SIFR service 212 facilitates SIFR between ANPs, and the federation service 214 facilitates identity federation services. This is discussed further below with regard to FIGS. 3-6.

Figure 3:
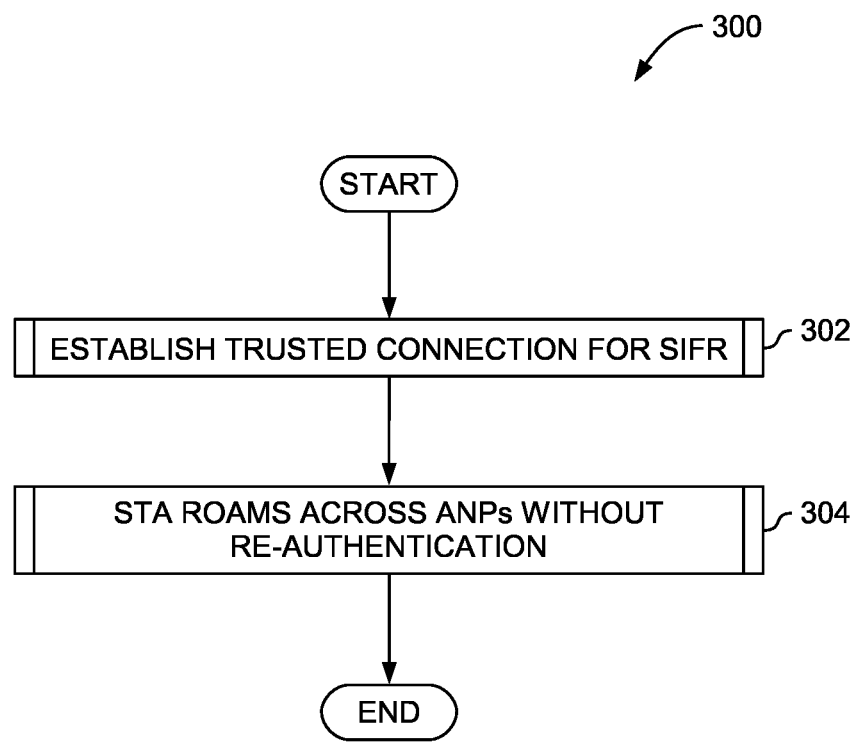
FIG. 3 is a flowchart for seamless identity federation roaming, according to one embodiment.

FIG. 3 is a flowchart 300 for SIFR, according to one embodiment. At block 302, a first ANP (e.g., the ANP 110 illustrated in FIG. 1) establishes a trusted connection for SIFR with a second ANP (e.g., the ANP 120 illustrated in FIG. 1). In an embodiment, a first hotspot connector associated with the first ANP (e.g., the hotspot connector 116 illustrated in FIG. 1) uses an identity federation (e.g., the federation 150 illustrated in FIG. 1) to establish a secure tunnel with another hotspot connector associated with the second ANP (e.g., the hotspot connector 126 illustrated in FIG. 1). This is discussed further with regard to FIG. 4, below.

At block 304, an STA (e.g, the STA 102B illustrated in FIG. 1) roams across ANPs (e.g., from the ANP 110 to the ANP 120 illustrated in FIG. 1) without re-authentication. In an embodiment, the STA uses the trusted connection established at block 302 to facilitate SIFR between ANPs (e.g., roaming without re-authentication). Further, in an embodiment, an RCOI is used as a virtual SSID to bridge the STA between two physical ANPs, allowing seamless roaming between the networks. By detecting this RCOI, the STA can determine that both networks may have different SSIDs and appear to be unrelated, but can still allow for SIFR through inter-network communication mechanisms. This is discussed further below with regard to FIG. 5.

Figure 4:
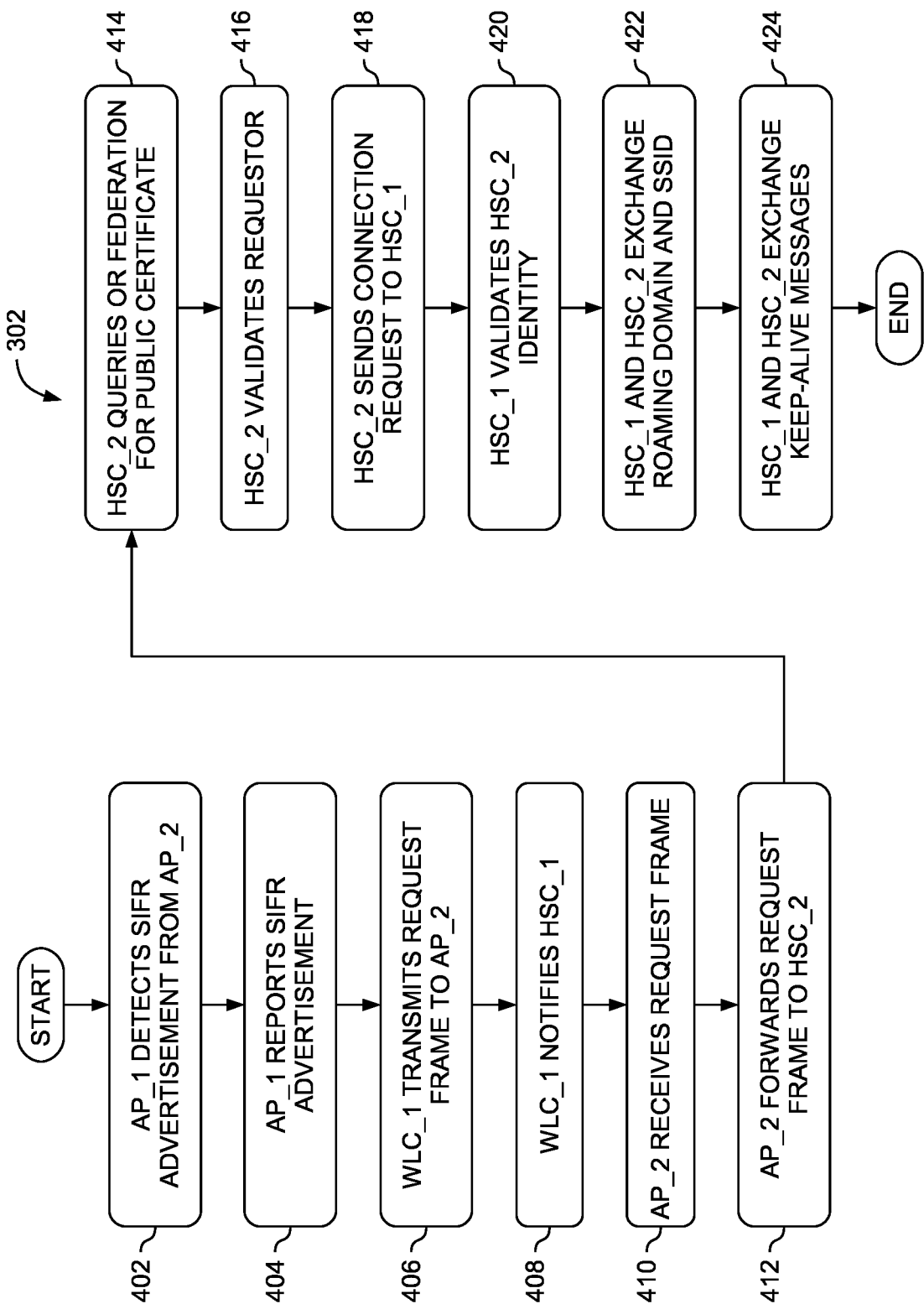
FIG. 4 is a flowchart for establishing a trusted connection for seamless identity federation roaming, according to one embodiment.

FIG. 4 is a flowchart for establishing a trusted connection for SIFR, according to one embodiment. In an embodiment, FIG. 4 corresponds with block 302 illustrated in FIG. 3. At block 402 a SIFR service (e.g., the SIFR service 212 illustrated in FIG. 2) in a first AP ("AP_1") detects an SIFR advertisement from a second AP ("AP_2"). In an embodiment, AP_1 is located in a different ANP from AP_2, and AP_1 and AP_2 both support SIFR. For example, AP_1 can correspond with the AP 112 illustrated in FIG. 1 and AP_2 can correspond with the AP 124 illustrated in FIG. 1. As discussed above, in an embodiment the SIFR advertisement is an RCOI or an IE in a network message (e.g., a beacon or probe). For example, an RCOI or an IE can include a bit identifying support for SIFR. These are merely examples, and the SIFR advertisement can be any provided in any suitable manner.

Further, in an embodiment, AP_1 detects AP_2 and the SIFR advertisement as part of neighbor discovery. Alternatively, AP_1 may be unable to directly detect an SIFR advertisement from AP_2. For example, there may be a barrier blocking transmission between AP_1 and AP_2. In this scenario, an STA can provide an SIFR advertisement from AP_2 to AP_1. This is discussed further below, with regard to FIG. 6.

At block 404, the SIFR service in AP_1 reports the SIFR advertisement (e.g., from AP_2) to a WLC associated with AP_1 ("WLC_1"). For example, WLC_1 can correspond with the WLC 114 illustrated in FIG. 1. In an embodiment, the SIFR service in AP_1 also reports the basic service set identifier (BSSID) for AP_2 to the WLC_1. As discussed above, in an embodiment, the AP_1 is associated with a WLC (e.g., WLC_1). Alternatively, or in addition, the AP_1 can itself include WLC functionality (e.g., without associating with a WLC).

At block 406, an SIFR service in WLC_1 transmits a request frame to the AP_2. In an embodiment, the SIFR service in WLC_1 transmits the request frame to the AP_2 through the AP_1. Further, in an embodiment, the request frame is a Generic Advertisement Service (GAS) initial request action frame. For example, the GAS initial request action frame can be a connector discovery request.

In an embodiment, the payload of the GAS frame includes a fully qualified domain name (FQDN) or an IP address for a hotspot connector associated with WLC_1 ("HSC_1"). For example, HSC_1 can correspond with the hotspot connector 116 illustrated in FIG. 1. Further, the payload can include BSSIDs for AP_1 and AP2, and a nonce (e.g., a cryptographic nonce associated with the ANP associated with HSC_1). In an embodiment, the SIFR HSSC_1 (or another suitable network component) encrypts the BSSIDs using a private key associated with HSSC_1.

At block 408, the SIFR service in WLC_1 notifies the HSC_1 about the request frame transmitted to AP_2. In an embodiment, the SIFR service in WLC_1 notifies the HSC_1 about the request using a RADIUS vendor-specific attribute (VSA) inform message. Further, in an embodiment, the SIFR service in WLC_1 provides HSC_1 with the BSSIDs and the nonce.

At block 410, an SIFR service in the AP_2 receives the request frame. At block 412, the SIFR service in AP_2 forwards the request frame to a second hotspot connector ("HSC_2") associated with the AP_2. For example, HSC_2 can correspond with the hotspot connector 126 illustrated in FIG. 1. In an embodiment, the AP_2 forwards the request frame to the HSC_2 using a second WLC ("WLC_2") associated with the AP_2. For example, WLC_2 can correspond with the WLC 224 illustrated in FIG. 1.

At block 414, an SIFR service in the HSC_2 queries the federation (e.g., the federation 150 illustrated in FIG. 1) for a public key associated with HSC_1 (or another suitable network component associated with HSC_1). Alternatively, the HSC_2 can use a federation service (e.g., the federation service 214 illustrated in FIG. 2) or any other suitable service. For example, the SIFR service in the HSC_2 can use the FQDN or IP address for the HSC_1 included in the request frame (e.g., the GAS request frame) to query the federation for the public key associated with the HSC_1.

At block 416, the SIFR service in the HSC_2 validates the requestor. For example, the SIFR service in the HSC_2 can then decrypt the BSSIDs for AP_1 and AP_2, included in the request frame, using the public key associated with the HSC_1. If this decryption is successful, then the SIFR service in the HSC_2 has validated that the BSSIDs in the request frame were encrypted using the private key associated with the HSC_1, and has validated that the HSC_1 is associated with a valid SIFR ANP.

Alternatively, or in addition, the SIFR service in the HSC_2 validates the requestor without retrieving a key from the federation (e.g., without performing block 414). For example, the SIFR service in the HSC_2 can transmit the encrypted BSSIDs from the request frame to the federation (e.g., along with the FQDN or IP address of the HSC_1). The federation could respond with the decrypted BSSID, with a success indication, or with another suitable reply indicating that it has validated the requestor.

At block 418, the SIFR service in the HSC_2 sends a connection request to the HSC_1. In an embodiment, the connection request includes the FQDN or IP address associated with HSC_2, BSSIDs associated with AP_2 and AP_1, and nonces associated with the ANP including HSC_2 and the ANP including HSC_2. In an embodiment, the SIFR service in the HSC_2 encrypts the BSSIDs using the private key associated with HSC_2. In an embodiment, the HSC_2 can transmit the request to HSC_1 using a wireless connection (e.g., a WiFi connection) or a wired connection.

At block 420, the SIFR service in HSC_1 receives the connection request from the HSC_2 and validates the identity of the HSC_2. In an embodiment, the SIFR service in HSC_1 can use a similar technique to the one described in connection with blocks 414 and 416, above. For example, the SIFR service in the HSC_1 queries the federation (e.g., the federation 150 illustrated in FIG. 1) for a public key associated with HSC_1 (or another suitable network component associated with HSC_1). Alternatively, the HSC_1 can use a federation service (e.g., the federation service 214 illustrated in FIG. 2) or any other suitable service. For example, the SIFR service in the HSC_1 can use the FQDN or IP address for the HSC_2 included in the connection request to query the federation for the public key associated with the HSC_2.

The SIFR service in the HSC_1 can then decrypt the BSSIDs for AP_1 and AP_2, included in the connection request, using the public key associated with the HSC_2. If this decryption is successful, then the SIFR service in the HSC_1 has validated that the BSSIDs in the request frame were encrypted using the private key associated with the HSC_2, and has validated that the HSC_2 is associated with a valid SIFR ANP.

Alternatively, or in addition, the SIFR service in the HSC_1 validates the requestor without retrieving a key from the federation. For example, the SIFR service in the HSC_1 can transmit the encrypted BSSIDs from the request frame to the federation (e.g., along with the FQDN or IP address of the HSC_2). The federation could respond with the decrypted BSSID, with a success indication, or with another suitable reply indicating that it has validated the identity of the HSC_2.

At block 422, the SIFR services in HSC_1 and HSC_2 exchange roaming domain information and SSIDs. As discussed above, at this point both HSC_1 and HSC_2 are connected using a trusted connection. The SIFR services in HSC_1 and HSC_2 can then exchange roaming domain information and SSID strings. In an embodiment, the SIFR services in HSC_1 and HSC_2 can communicate using a secure tunnel. Further, in an embodiment, the SIFR services in HSC_1 and HSC_2 can use any suitable technique for roaming domain value, including first-to-suggest, random-pick, or any other suitable technique.

At block 424, the SIFR services in HSC_1 and HSC_2 exchange keep-alive messages. In an embodiment, after the trusted connection is established, both HSCs exchange keep-alive messages (e.g., through a protected tunnel) to maintain the trusted connection. Further, in embodiment, the techniques discussed above in relation to FIG. 4 can be repeated as neighboring ANPs supporting SIFR detect each other (e.g., establishing further trusted connections).

Figure 5:
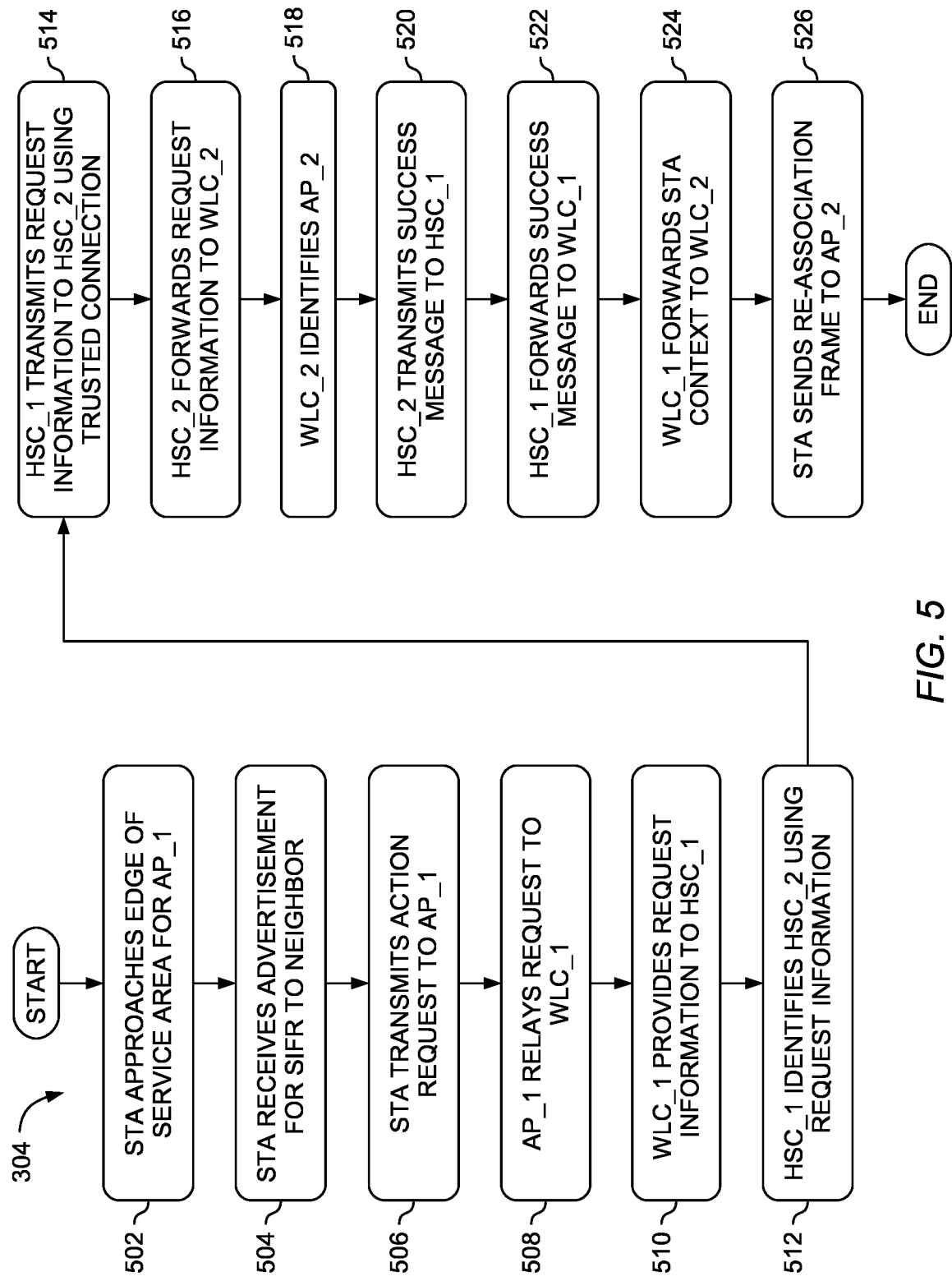
FIG. 5 is a flowchart for roaming between ANPs using seamless identity federation roaming, according to one embodiment.

FIG. 5 is a flowchart for roaming between ANPs using SIFR, according to one embodiment. In an embodiment, FIG. 5 corresponds with block 304 in FIG. 3. At block 502, an STA (e.g., the STA 102B illustrated in FIG. 1) approaches the edge of the service area for an AP_1 (e.g., the AP 112 illustrated in FIG. 1). For example, the STA can be connected to the AP 1 and associated with an ANP_1. In an embodiment, the ANP_1 is the ANP in which the AP_1 operates (e.g., the ANP 110 illustrated in FIG. 1). The STA can use Fast Transition (FT) (e.g., 802.11r FT) to learn the shared roaming domain name associated with the ANP_1 (e.g., the identity federation shared domain name). In an embodiment, as the STA approaches the edge of the service area for the AP_1, it nears the service area for an AP_2 (e.g., the AP 122 illustrated in FIG. 1). For example, the AP_1 and the AP_2 can be adjacent, but associated with different ANPs.

At block 504, an SIFR service (e.g., the SIFR service 212 illustrated in FIG. 2) at the STA receives an advertisement for SIFR associated with the AP_2 and an ANP_2. In an embodiment, the ANP_2 is the ANP in which the AP_2 operates (e.g., the ANP 120 illustrated in FIG. 1). The advertisement can, for example, include the shared domain name associated with the ANP_1, an indication that SIFR is supported, the BSSID associated with AP 2 and the SSID associated with ANP 2.

At block 506 the SIFR service at the STA transmits an action request (e.g., a FT action request) to the AP_1. In an embodiment, the action request includes a request to roam to AP_2. The action request can include suitable identifying information, including the media access control (MAC) address for the STA, the shared domain name, and the target BSSID (e.g., the BSSID for AP_2). The action request can further include the SSID for the ANP_2 associated with the AP_2.

At block 508, an SIFR service in the AP_1 relays the action request to a WLC_1. In an embodiment, the WLC_1 is a WLC associated with the AP_1 (e.g., the WLC 114 illustrated in FIG. 1).

At block 510, an SIFR service in the WLC_1 provides the request to a hotspot connector (HSC_1) associated with the WLC_1 (e.g., the hotspot connector 116 illustrated in FIG. 1). In an embodiment, the SIFR service in the WLC_1 provides to the HSC_1 a set of data including: [STA MAC address; Target BSSID; Shared Domain Name; Target Network SSID]. The SIFR service in the WLC_1 can further provide the HSC_1 with a pairwise master key (PMK) associated with the STA. Alternatively, or in addition, the HSC_1 already has access to the PMK associated with the STA and the WLC_1 does not provide the PMK to the HSC_1.

At block 512, an SIFR service in the HSC_1 identifies a hotspot connector (HSC_2) associated with the ANP_2 (e.g., the hotspot connector 126 illustrated in FIG. 1) using the request information. For example, the SIFR service in the HSC_1 can use the SSID provided by the WLC_1 to identify the owner of the target BSSID. Alternatively, or in addition, the SIFR service in the HSC_1 can use the target BSSID value.

At block 514, the SIFR service in the HSC_1 transmits the request information to the HSC_1 using a trusted connection. As discussed above with regard to block 302 and FIG. 4, in an embodiment the HSC_1 and HSC_2 have established a trusted connection to facilitate SIFR between ANP_1 and ANP_2. The SIFR service in the HSC_1 transmits the request information to the HSC_2 using this trusted connection.

At block 516, an SIFR service in the HSC_2 forwards the request information to a WLC (WLC_2) associated with the ANP_2 (e.g., the WLC 124 illustrated in FIG. 1). At block 518, an SIFR service in the WLC_2 uses the request information to identify the AP2 (e.g., the target AP).

At block 520, the SIFR service in the HSC_2 transmits a success message to the HSC_1. In an embodiment, after the WLC_2 successfully identifies the target AP (e.g., AP_2), the SIFR service in the HSC_2 transmits the success message.

At block 522, the SIFR service in the HSC_1 forwards the success message to the WLC_1. In an embodiment, the WLC_1 generates a success response (e.g., an FT success response) for the STA.

At block 524, the SIFR service in the WLC_1 forwards the STA context (e.g., generated based on the connection of the STA to the AP_1) to the WLC_2. In an embodiment, the SIFR service in the WLC_1 forwards the STA context to the WLC_2 using the HSC_1 and the HSC_2 (e.g., using the trusted connection established between the HSC_1 and the HSC_2). This is merely an example, and the SIFR service in the WLC_1 can transmit the STA context to the WLC_2 in any suitable manner. In an embodiment, the STA context includes quality of service (QoS) policy information, subnet information, identity provider (IdP) values, and any other suitable context information.

Further, in an embodiment, the SIFR service in the WLC_2 can apply additional policies, decline the roam, or contact the IdP. For example, the SIFR service in the WLC_2 can use a change of operation (CoA) inform message, or can exchange further policies based on a relationship between the IdP and the ANP_2.

At block 526, the SIFR service in the STA sends a re-association frame to the AP_2. For example, the STA is de-associated from the AP_1 and associated with the AP_2. This completes the seamless roam. In an embodiment, once the re-association completes, the WLC_2 may forward client traffic to the WLC_1. For example, if subnets are different between the ANP_1 and the ANP_2, the WLC_2 can effectively anchor the STA session to the HSC_1, allowing the STA to maintain its IP address, after de-associating with AP_1 and re-associating with AP_2, without redoing the dynamic host configuration protocol (DHCP) process to identify a new IP address. In an embodiment, the WLC_2 communicates with the WLC_1 using the HSC_2 and the HSC_1 (e.g., using the trusted connection). This is merely one example, and other suitable techniques can be used to maintain the IP address for the STA, including using a dynamic network address translation (NAT) entry on the WLC_2, or a proxy mobile IP. In an embodiment, when the STA is idle for a target duration (e.g., 15 seconds), the WLC_2 transmits a DHCP force renew request to the STA to complete the transition to the ANP_2.

Figure 6:
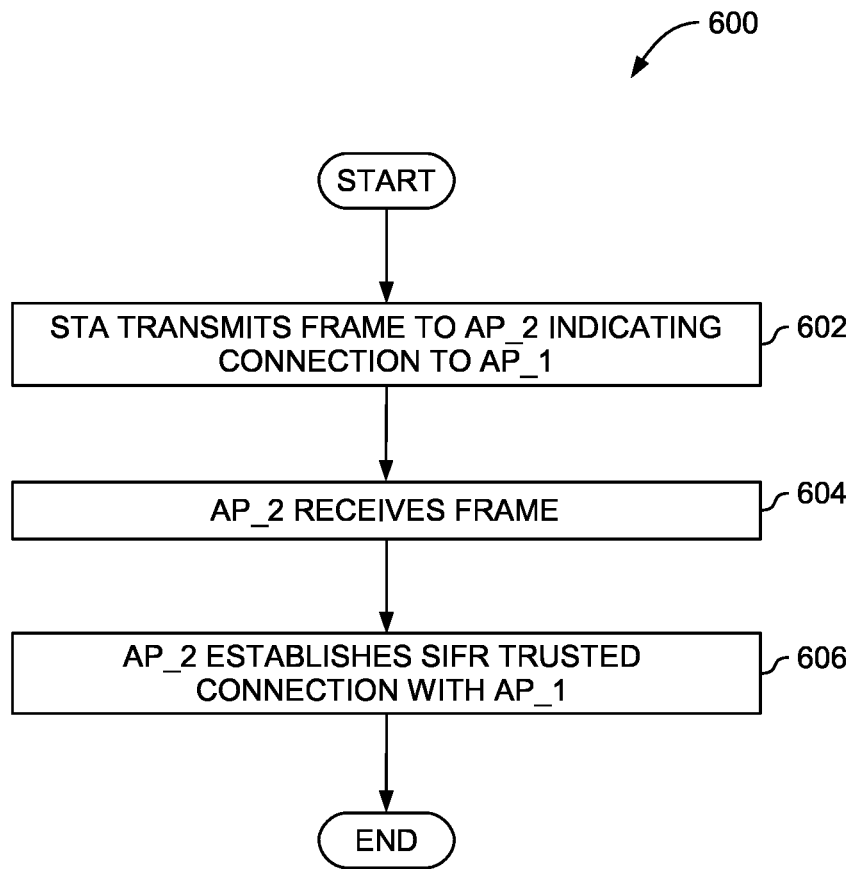
FIG. 6 is a flowchart for detecting support for seamless identity federation roaming, according to one embodiment.

FIG. 6 is a flowchart 600 for detecting support for SIFR, according to one embodiment. As discussed above in relation to block 302 in FIG. 3 and the techniques in FIG. 4, in an embodiment a first AP (AP_1) (e.g., the AP 112 illustrated in FIG. 1) establishes a trusted SIFR connection with a second AP (AP_2) (e.g., the AP 122 illustrated in FIG. 1) after receiving an advertisement that AP_2 supports SIFR. But in some circumstances, the AP_2 may be unable to communicate directly with the AP_1. For example, a physical barrier could block communication between the AP_2 and the AP_1, but still allow an STA to successfully roam between the AP_1 and the AP_2. In this circumstance, the STA can initiate the trusted SIFR connection between the AP_1 and the AP_2, as discussed further below.

At block 602, an SIFR service (e.g., the SIFR service 212 illustrated in FIG. 2) in the STA (e.g., the STA 102B illustrated in FIG. 1) transmits a frame to the AP_2 indicating that the STA is connected to the AP_1. Further, in an embodiment, the frame indicates that the ANP (ANP_1) associated with the AP_1 (e.g., the ANP 110 illustrated in FIG. 1) supports SIFR. In an embodiment, as discussed above, AP_1 is not able to communicate with AP_2 (e.g., because of a barrier) but the STA is able to communicate with both the AP_1 and the AP_2.

At block 604 an SIFR service in the AP_2 receives the frame. Further, in an embodiment, the STA transmits the frame to any AP within communication reach of the STA. Each AP that receives the frame can then attempt to establish a trusted SIFR connection, as described with regard to FIG. 4 and below.

At block 606, the SIFR service in the AP_2 establishes an SIFR trusted connection with the AP_1. In an embodiment, the SIFR service in the AP_2 undertakes the techniques described above in relation to blocks 404 through 424 illustrated in FIG. 4.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving a roaming request at a first wireless access point (AP) from a wireless station (STA) to roam from the first AP to a second AP, wherein the first AP is associated with a first access network provider (ANP), the second AP is associated with a second ANP, and the first ANP is different from the second ANP;
   transmitting authentication information relating to the STA from the first ANP to the second ANP using a trusted connection, wherein the trusted connection was previously established between the first ANP and the second ANP based on a query to an identity federation to which both the first and second ANP belong, and wherein establishing the trusted connection comprises:
   generating an encrypted identifier at the first ANP using a private key associated with the first ANP; and
   transmitting the encrypted identifier, and an un-encrypted identifier associated with the first ANP, from the first ANP to the second ANP, wherein the second ANP is configured to:
   transmit the un-encrypted identifier to the identity federation in the query to the identity federation, and in response receive a public key corresponding with the private key; and
   decrypt the encrypted identifier using the public key; and
   de-associating the STA from the first AP, wherein the STA is re-associated at the second AP using the transmitted authentication information.

2. The method of claim 1, wherein the private key and the public key are associated with a same network component in the first ANP.

3. The method of claim 2, wherein the same network component comprises a hotspot connector associated with the first ANP, and wherein the un-encrypted identifier comprises at least one of: (i) a domain name or (ii) an IP address associated with the hotspot connector.

4. The method of claim 1, wherein the second ANP is configured to validate the encrypted identifier based on transmitting the encrypted identifier to the identity federation in the query.

5. The method of claim 1, wherein the trusted connection was established based on an advertisement message received at the first AP from the second AP.

6. The method of claim 1, wherein the trusted connection was established based on a message received at the second AP from the STA.

7. The method of claim 1, further comprising:
   transmitting context information associated with the STA from the first ANP to the second ANP using the trusted connection.

8. The method of claim 1, further comprising:
   receiving client traffic relating to the STA at a first controller associated with the first ANP after the de-associating, wherein the client traffic is forwarded by a second controller associated with the second ANP to the first controller, and wherein the STA maintains a same IP address before and after the de-associating.

9. A computer program product, comprising:
   a non-transitory computer-readable storage medium having computer-readable program code embodied therewith, the computer-readable program code executable by one or more computer processors to perform an operation, the operation comprising:
   receiving a roaming request at a first wireless access point (AP) from a wireless station (STA) to roam from the first AP to a second AP, wherein the first AP is associated with a first access network provider (ANP), the second AP is associated with a second ANP, and the first ANP is different from the second AN P;
   transmitting authentication information relating to the STA from the first ANP to the second ANP using a trusted connection, wherein the trusted connection was previously established between the first ANP and the second ANP based on a query to an identity federation to which both the first and second ANP belong, and wherein establishing the trusted connection comprises:

generating an encrypted identifier at the first ANP using a private key associated with the first ANP;

transmitting the encrypted identifier, and an un-encrypted identifier associated with the first ANP, from the first ANP to the second ANP, wherein the second ANP is configured to:

transmit the un-encrypted identifier to the identity federation in the query to the identity federation, and in response receive a public key corresponding with the private key; and decrypt the encrypted identifier using the public key; and de-associating the STA from the first AP, wherein the STA is re-associated at the second AP using the transmitted authentication information.

10. The computer program product of claim 9, wherein the second ANP is configured to validate the encrypted identifier based on transmitting the encrypted identifier to the identity federation in the query.

11. The computer program product of claim 9, the operation further comprising:

receiving client traffic relating to the STA at a first controller associated with the first ANP after the de-associating, wherein the client traffic is forwarded by a second controller associated with the second ANP to the first controller, and wherein the STA maintains a same IP address before and after the de-associating.

12. A system, comprising:

a processor; and a memory storing a program, which, when executed on the processor, performs an operation, the operation comprising:

receiving a roaming request at a first wireless access point (AP) from a wireless station (STA) to roam from the first AP to a second AP, wherein the first AP is associated with a first access network provider (ANP), the second AP is associated with a second ANP, and the first ANP is different from the second ANP;

transmitting authentication information relating to the STA from the first ANP to the second ANP using a trusted connection, wherein the trusted connection was previously established between the first ANP and the second ANP based on a query to an identity federation to which both the first and second ANP belong, and wherein establishing the trusted connection comprises:

generating an encrypted identifier at the first ANP using a private key associated with the first ANP;

transmitting the encrypted identifier, and an un-encrypted identifier associated with the first ANP, from the first ANP to the second ANP, wherein the second ANP is configured to:

transmit the un-encrypted identifier to the identity federation in the query to the identity federation, and in response receive a public key corresponding with the private key; and decrypt the encrypted identifier using the public key; and de-associating the STA from the first AP, wherein the STA is re-associated at the second AP using the transmitted authentication information.

13. The system of claim 12, wherein the second ANP is configured to validate the encrypted identifier based on transmitting the encrypted identifier to the identity federation in the query.

14. The system of claim 12, the operation further comprising:

receiving client traffic relating to the STA at a first controller associated with the first ANP after the de-associating, wherein the client traffic is forwarded by a second controller associated with the second ANP to the first controller, and wherein the STA maintains a same IP address before and after the de-associating.

* * * * *

UNITED STATES PATENT AND TRADEMARK OFFICE
CERTIFICATE OF CORRECTION

PATENT NO. : 11,653,206 B2
APPLICATION NO. : 17/301971
DATED : May 16, 2023
INVENTOR(S) : Jerome Henry et al.

It is certified that error appears in the above-identified patent and that said Letters Patent is hereby corrected as shown below:

In the Claims

In Column 12, Line 59, in Claim 9, delete "AN P;" and insert -- ANP; --.

Signed and Sealed this
Thirteenth Day of August, 2024

Katherine Kelly Vidal
Director of the United States Patent and Trademark Office